United States Patent
Nagasawa

(10) Patent No.: US 11,751,038 B2
(45) Date of Patent: Sep. 5, 2023

(54) AUTOMATIC EMERGENCY REPORTING SYSTEM FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 129 days.

(21) Appl. No.: 17/386,529

(22) Filed: Jul. 27, 2021

(65) Prior Publication Data

US 2022/0038881 A1 Feb. 3, 2022

(30) Foreign Application Priority Data

Jul. 31, 2020 (JP) ................................ 2020-130803

(51) Int. Cl.
*H04W 4/90* (2018.01)
*H04W 4/44* (2018.01)
*G08G 1/16* (2006.01)
*G08G 1/04* (2006.01)

(52) U.S. Cl.
CPC ............... *H04W 4/90* (2018.02); *G08G 1/04* (2013.01); *G08G 1/164* (2013.01); *H04W 4/44* (2018.02)

(58) Field of Classification Search
CPC .......... H04W 4/90; H04W 4/44; G08G 1/164; G08G 1/205; G08B 25/016
See application file for complete search history.

(56) References Cited

U.S. PATENT DOCUMENTS

| | | | | |
|---|---|---|---|---|
| 2013/0057696 A1* | 3/2013 | Felt | ......................... | H04N 7/186 348/158 |
| 2017/0345297 A1* | 11/2017 | Umehara | .............. | G08G 1/0133 |
| 2020/0126325 A1* | 4/2020 | Jeon | ........................ | H04W 4/44 |

FOREIGN PATENT DOCUMENTS

JP 2001-216588 A 8/2001

* cited by examiner

*Primary Examiner* — Minjung Kim
(74) *Attorney, Agent, or Firm* — McDermott Will & Emery LLP

(57) ABSTRACT

An automatic emergency reporting system for a vehicle includes a determiner, a normality transmitter, a detector, and an emergency transmitter. The determiner determines a quality of communication between a communication terminal of the vehicle and a server. The normality transmitter transmits rich information available in the server from the communication terminal in a normal state. The detector detects an emergency of the vehicle. The emergency transmitter transmits emergency information from the communication terminal to the server after the detection. The emergency transmitter transmits the rich information with the emergency information in response to the detection of the emergency of the vehicle in a state in which a status of the communication with the server is satisfactory. The emergency transmitter transmits the emergency information in response to the detection of the emergency of the vehicle in a state in which the status of the communication with the server is not satisfactory.

16 Claims, 6 Drawing Sheets

AUTOMATIC EMERGENCY REPORTING SYSTEM FOR VEHICLE

CROSS-REFERENCE TO RELATED APPLICATIONS

The present application claims priority from Japanese Patent Application No. 2020-130803 filed on Jul. 31, 2020, the entire contents of which are hereby incorporated by reference.

BACKGROUND

The disclosure relates to an automatic emergency reporting system for a vehicle.

In the event of an accident of an automobile or other vehicles, the accident may be reported as an emergency. For example, an automatic emergency reporting system for automobiles is put into practical use. In the automatic emergency reporting system, an automobile in an accident uses its automatic reporting device to transmit, to a server of a call center, emergency information in the accident, such as an operation status of an occupant protection device in the accident, a site of the accident, and an input direction and an intensity of a shock caused by the accident (Japanese Unexamined Patent Application Publication No. 2001-216588). In the call center, the server checks the received emergency information and makes a call for action to either one of an air medical service and an emergency medical force. Thus, an emergency action can be taken based on the information in the accident to increase a possibility of saving a person in the accident.

SUMMARY

An aspect of the disclosure provides an automatic emergency reporting system for a vehicle. The vehicle is configured to automatically transmit emergency information from a communication terminal of the vehicle to a server when an emergency has occurred in the vehicle. The automatic emergency reporting system includes a determiner, a normality transmitter, a detector, and an emergency transmitter. The determiner is provided in the vehicle and is configured to determine a quality of communication between the communication terminal and the server. The normality transmitter is configured to transmit rich information available in the server from the communication terminal in a normal state of the vehicle in which the determiner determines that a status of the communication with the server is satisfactory. The detector is configured to detect the emergency of the vehicle. The emergency transmitter is configured to transmit the emergency information related to the emergency of the vehicle from the communication terminal to the server after detection of the emergency of the vehicle by the detector. The emergency transmitter is configured to transmit the rich information together with the emergency information related to the emergency of the vehicle in response to the detection of the emergency of the vehicle in a state in which the determiner determines that the status of the communication with the server is satisfactory. The emergency transmitter is configured to transmit the emergency information in response to the detection of the emergency of the vehicle in a state in which the determiner does not determine that the status of the communication with the server is satisfactory.

An aspect of the disclosure provides an automatic emergency reporting system for a vehicle. The vehicle is configured to automatically transmit emergency information from a communication terminal of the vehicle to a server when an emergency has occurred in the vehicle. The automatic emergency reporting system includes circuitry. The circuitry is configured to determine a quality of communication between the communication terminal and the server. The circuitry is configured to transmit rich information available in the server from the communication terminal in a normal state of the vehicle in which determination is made that a status of the communication with the server is satisfactory. The circuitry is configured to detect the emergency of the vehicle. The circuitry is configured to transmit the emergency information related to the emergency of the vehicle from the communication terminal to the server after detection of the emergency the emergency of the vehicle. The circuitry is configured to transmit the rich information together with the emergency information related to the emergency of the vehicle in response to the detection of the emergency of the vehicle in a state in which determination is made that the status of the communication with the server is satisfactory. The circuitry is configured to transmit the emergency information in response to the detection of the emergency of the vehicle in a state in which determination is not made that the status of the communication with the server is satisfactory.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Even though an automobile in an accident transmits emergency information in the accident, such as an operation status of an occupant protection device in the accident, a site of the accident, and an input direction and an intensity of a shock caused by the accident, a server may fail to make a call for emergency action satisfactorily responding to the accident. For example, the server can estimate the likelihood of the condition of an occupant after the accident based on the input direction and the intensity of the shock caused by the accident and the operation status of the occupant protection device. However, this estimation is not always accurate estimation of the condition of an occupant after each accident. To address such a case, images showing the inside and outside of a vehicle in an accident may be transmitted from the vehicle to the server. Therefore, it is appropriate that the traveling vehicle can always transmit a large amount of information.

There is a limit to proliferation of public utilities such as base stations communicable with vehicles. For example, it is not realistic that base stations capable of communicating a large amount of information be installed along roads with little traffic in suburban areas. In those regions, it is economical to install general base stations capable of managing a wide zone.

It is desirable to improve the emergency reporting for the vehicles.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
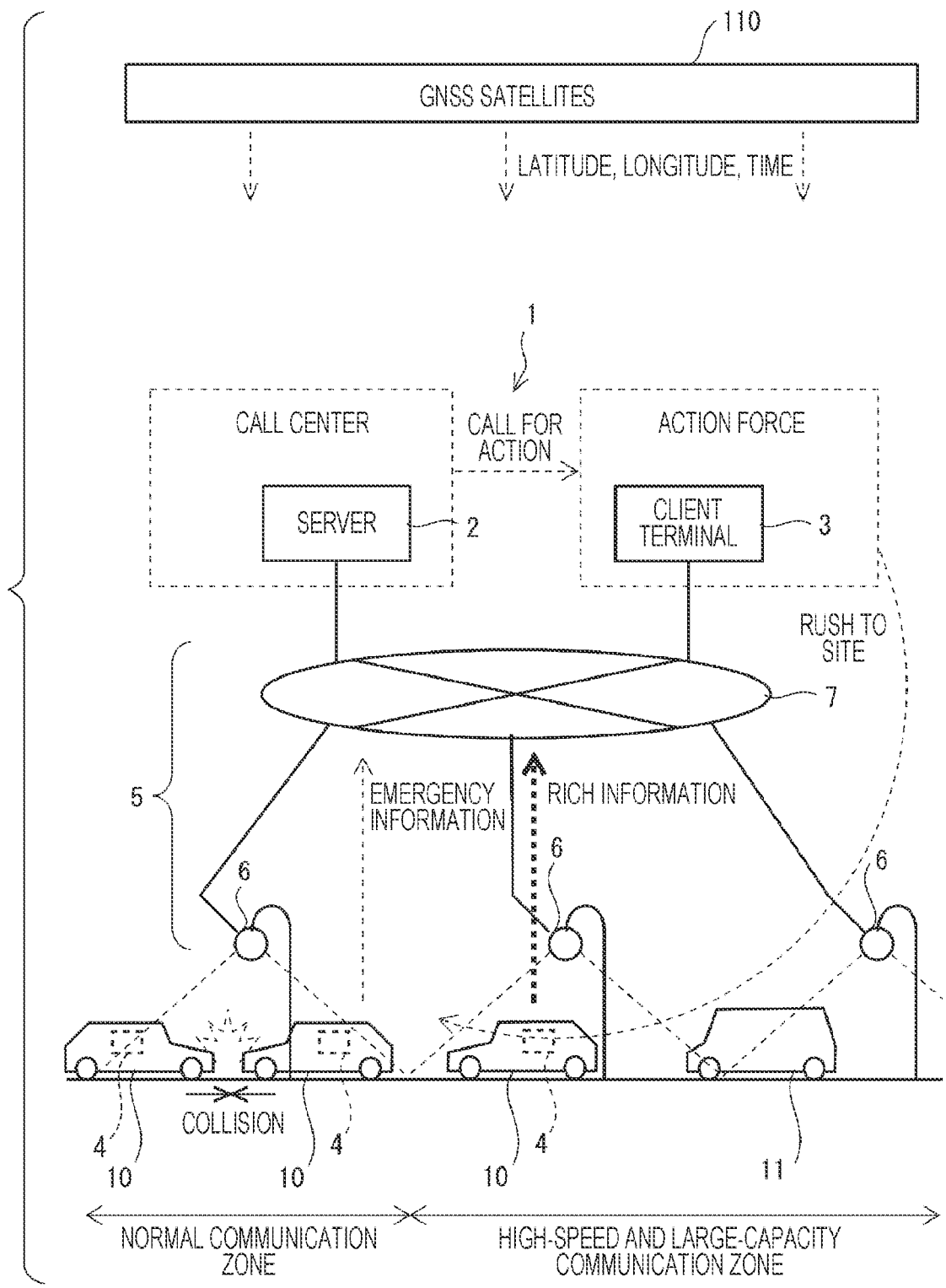
FIG. 1 is an explanatory diagram of an example of an automatic emergency reporting system for automobiles according to an embodiment of the disclosure.

FIG. 1 is an explanatory diagram of an example of an automatic emergency reporting system 1 for automobiles 10 according to the embodiment of the disclosure.

The automatic emergency reporting system 1 of FIG. 1 includes a server 2, a client terminal 3, an automatic reporting device 4, and a wireless communication network 5. The server 2 is used at a call center of an organization that manages road accidents caused by, for example, automobiles 10. The client terminal 3 is used at a rescue force such as a fire department. The automatic reporting device 4 is provided in each of the automobiles 10. The wireless communication network 5 provides communication lines for those devices. The wireless communication network 5 includes base stations 6 and a communication network 7. For example, the base stations 6 are distributed in a region along roads to communicate with wireless terminals such as the automatic reporting device 4. The communication network 7 couples the base stations 6. The base station 6 functions as an access point that couples a plurality of wireless terminals in a communicable zone. The base stations 6 in FIG. 1 are switched from latest models that support high-speed and large-capacity communication to general models that support normal communication when the automobiles 10 travel from right to left. For example, the base stations 6 that support high-speed and large-capacity communication employ a 5G system. For example, the general base stations 6 that support normal communication employ a 4G system. Examples of a boundary between the communication systems include a boundary between an urban area and a suburban area, and a boundary between an expressway and an ordinary road. The server 2 of the call center and the client terminal 3 of the rescue force are coupled to the communication network 7 of FIG. 1.

Examples of the automatic emergency reporting system 1 for the automobiles 10 in accidents include advanced automatic collision notification (AACN). In the AACN, an automobile 10 in an accident promptly and automatically transmits accident information to the server 2 of the call center. In the event of emergency, the automobile 10 automatically transmits emergency information to the server 2. Based on the report, the rescue force sends either one of an ambulance 11 and a rescue helicopter in response to a call for action from the call center. The call center can select a rescue force and make a call for action depending on details of the accident. Either one of the ambulance 11 and the rescue helicopter can go to the site of the accident while grasping the details. Thus, appropriate life-saving treatment can promptly be provided for a person in the accident in a short lead time.

Although the automatic emergency reporting system 1 of FIG. 1 is used by the plurality of organizations in cooperation, the system may be used by, for example, any one of a police, a fire department, a city office, a hospital, a medical organization, a security company, and a management company that manages the region including roads for the automobiles 10.

FIG. 1 illustrates GNSS satellites 110. The devices in FIG. 1 can acquire their locations and times by receiving radio waves including positional information (latitudes and longitudes) and time information from the GNSS satellites 110. For example, current times of a plurality of devices can agree with each other with high accuracy by receiving radio waves from a plurality of GNSS satellites 110 in cooperation. Thus, a common time can be used. The use of the common time can increase the reliability of a time of occurrence of emergency such as an accident.

Figure 2:
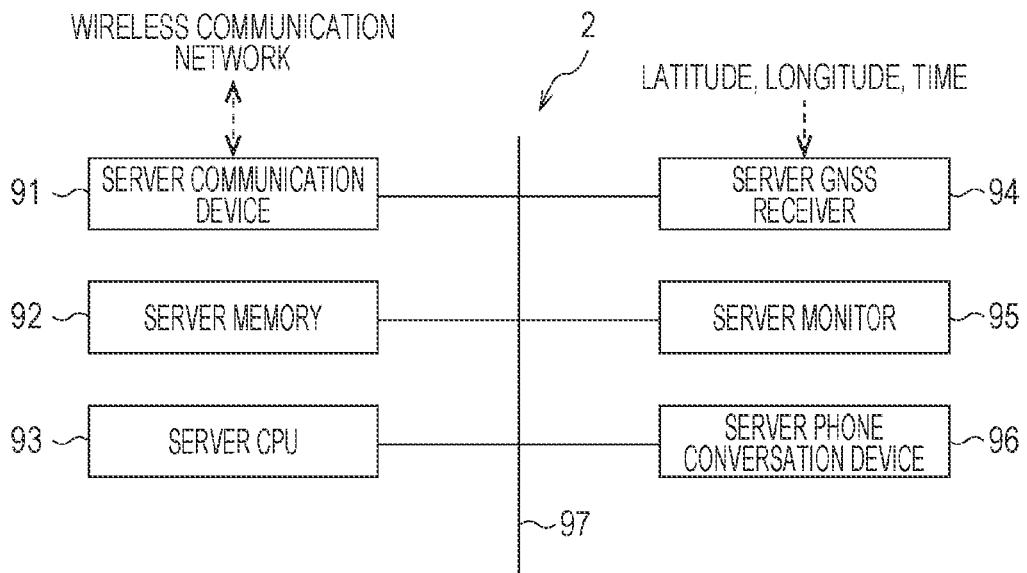
FIG. 2 is an explanatory diagram of a server of a call center in FIG. 1.

FIG. 2 is an explanatory diagram of the server 2 of the call center in FIG. 1.

The server 2 in FIG. 2 includes a server communication device 91, a server memory 92, a server CPU 93, a server GNSS receiver 94, a server monitor 95, a server phone conversation device 96, and a server bus 97 that couples those devices.

The server communication device 91 is coupled to the communication network 7 of the wireless communication network 5. The server communication device 91 exchanges data with other devices such as the client terminal 3 and an external communication terminal 60 of the automobile 10 described later via the wireless communication network 5.

The server GNSS receiver 94 acquires a current time by receiving a radio wave from the GNSS satellite 110. The server 2 may have a server timer (not illustrated) to be calibrated based on the current time from the server GNSS receiver 94.

The server monitor 95 displays information of the server 2. For example, the server monitor 95 displays information received from an automobile 10 in an accident.

The server phone conversation device 96 is used by an operator of the call center to establish a phone conversation line with, for example, the external communication terminal 60 of the automobile 10 by using the server communication device 91. Thus, the operator can have a phone conversation with an occupant of the automobile 10.

The server memory 92 is a computer-readable recording medium and records, for example, setting values and programs to be executed by the server CPU 93. The server memory 92 may record information on details of control of the server CPU 93. The server CPU 93 reads and executes the programs in the server memory 92. Thus, the server 2 implements a server controller. The server CPU 93 serving as the server controller manages overall operations of the server 2.

Figure 3:
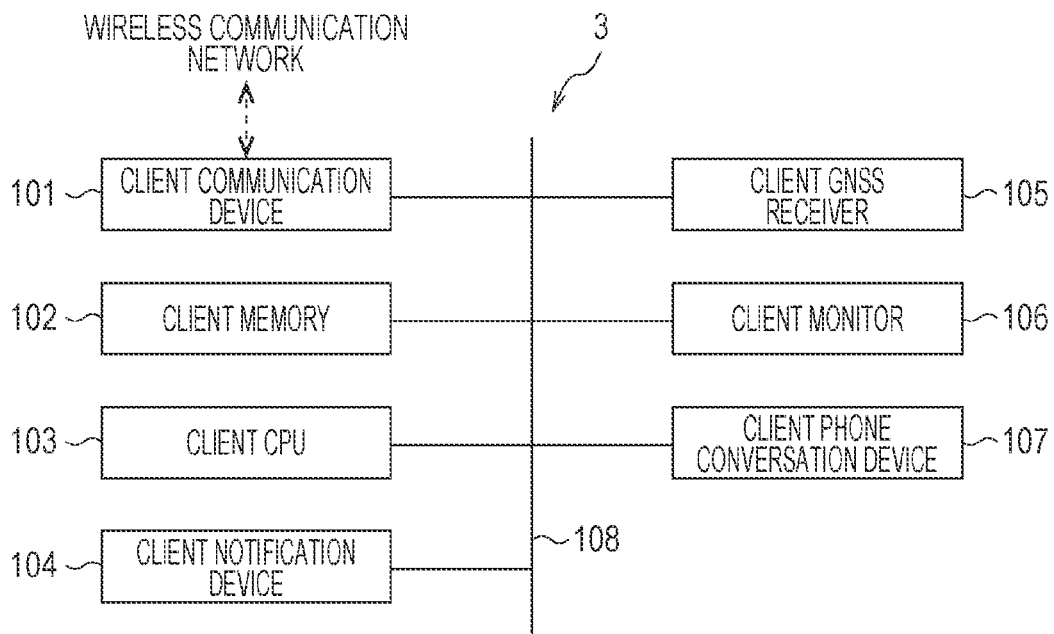
FIG. 3 is an explanatory diagram of a client terminal of an action force in FIG. 1.

FIG. 3 is an explanatory diagram of the client terminal 3 of the action force in FIG. 1.

The client terminal 3 in FIG. 3 includes a client communication device 101, a client memory 102, a client CPU 103, a client notification device 104, a client GNSS receiver 105, a client monitor 106, a client phone conversation device 107, and a client bus 108 that couples those devices.

The client communication device 101 is coupled to the communication network 7 of the wireless communication network 5. The client communication device 101 establishes a phone conversation line with other devices such as the external communication terminal 60 of the automobile 10 and the server phone conversation device 96 of the server 2 via the wireless communication network 5. Thus, a staff member of the action force can have a phone conversation with the occupant of the automobile 10 and the operator of the call center.

The client GNSS receiver 105 acquires a current time by receiving a radio wave from the GNSS satellite 110. The client terminal 3 may have a client timer (not illustrated) to be calibrated based on the current time from the client GNSS receiver 105.

The client monitor 106 displays information of the client terminal 3. For example, the client monitor 106 displays a call for action from the server 2.

The client notification device 104 outputs a sound indicating the call for action to a staff of the action force.

The client phone conversation device 107 is used by the staff member of the action force to have a phone conversation with a user of a mobile terminal coupled by using the client communication device 101.

The client memory 102 is a computer-readable recording medium and records, for example, setting values and programs to be executed by the client CPU 103. The client memory 102 may record information on details of control of the client CPU 103. The client CPU 103 reads and executes the programs in the client memory 102. Thus, the client terminal 3 implements a client controller. The client CPU 103 serving as the client controller manages overall operations of the client terminal 3.

Figure 4:
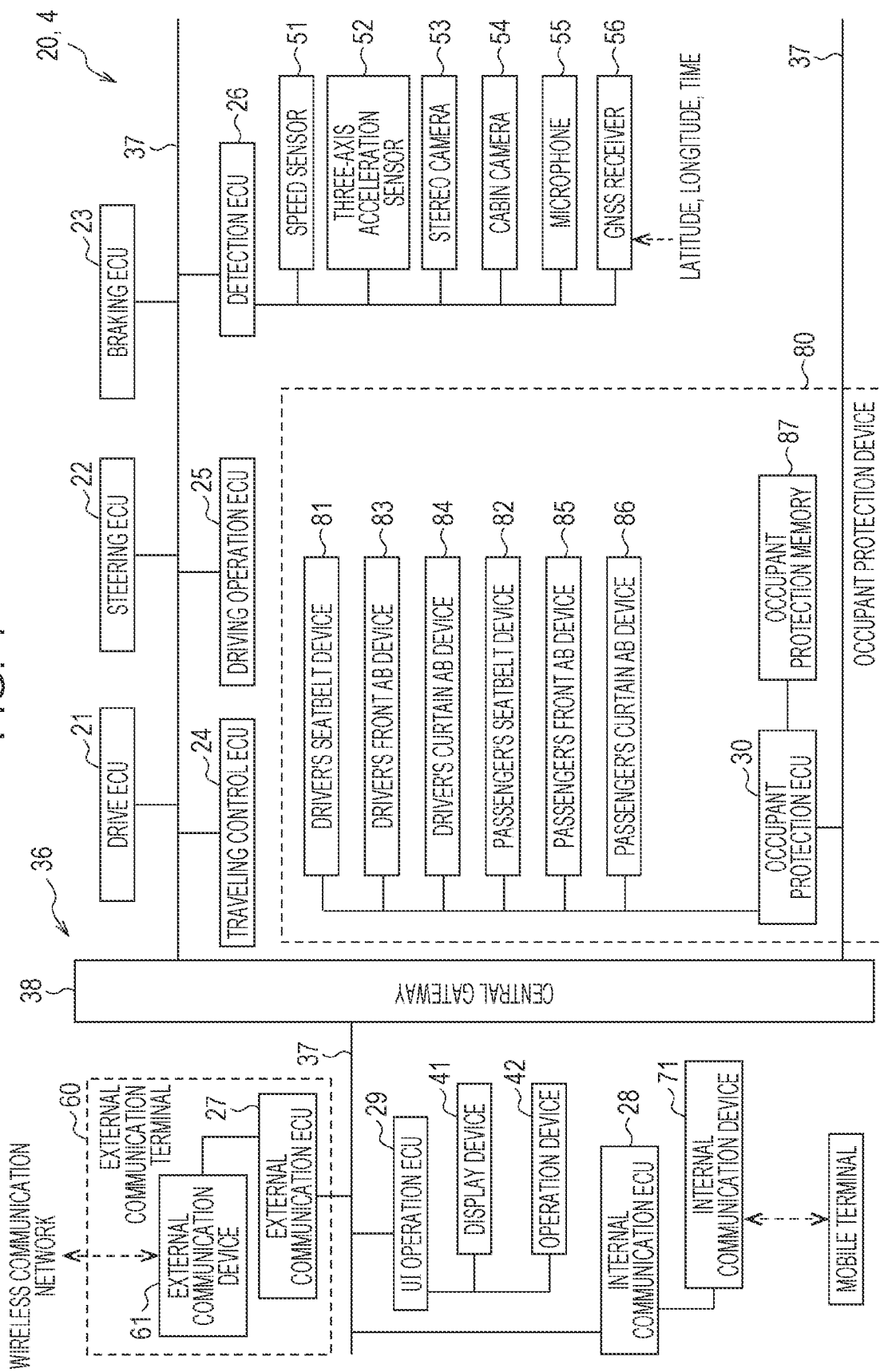
FIG. 4 is an explanatory diagram of a control system that can function as an automatic reporting device in an automobile that may have an emergency such as an accident in FIG. 1.

FIG. 4 is an explanatory diagram of a control system 20 that can function as an automatic reporting device 4 in an automobile 10 that may have an emergency such as an accident in FIG. 1.

In the control system 20 of the automobile 10 in FIG. 4, a plurality of controllers are represented by control electronic control units (ECUs) mounted on the respective controllers. Each controller may have not only the control ECU but also, for example, a memory that records a control program and data, an input/output port coupled to either one of a control target and its condition detector, a timer that measures a period and a time, and an internal bus that couples those devices.

Examples of the control ECUs illustrated in FIG. 4 include a drive ECU 21, a steering ECU 22, a braking ECU 23, a traveling control ECU 24, a driving operation ECU 25, a detection ECU 26, an external communication ECU 27, an internal communication ECU 28, a UI operation ECU 29, and an occupant protection ECU 30. The control system 20 of the automobile 10 may have other control ECUs (not illustrated).

The control ECUs are coupled to a vehicle network 36 such as a controller area network (CAN) or a local interconnect network (LIN) employed in the automobile 10. The vehicle network 36 may include a plurality of bus cables 37 that can couple the control ECUs, and a central gateway (CGW) 38 serving as a repeater coupled to the bus cables 37. The control ECUs have different IDs serving as identification information. Basically, each control ECU periodically outputs data to other control ECUs. The data includes an ID of a source control ECU and an ID of a destination control ECU. For example, each of the other control ECUs monitors the bus cables 37 and acquires data and executes processes based on the data when the destination ID is directed to the control ECU. The central gateway 38 monitors the coupled bus cables 37 and, when detecting a control ECU coupled to a bus cable 37 different from that of the source control ECU, outputs data to the bus cable 37. Through the repeating process of the central gateway 38, the control ECUs can exchange data with other control ECUs coupled to bus cables 37 different from those coupled to the source bus cables 37.

For example, a display device 41 and an operation device 42 are coupled to the UI operation ECU 29 as user interfaces for an occupant of the automobile 10. Examples of the display device 41 include a liquid crystal display and a projector. Examples of the operation device 42 include a touch panel, a keyboard, and a non-contact operation detector. For example, the display device 41 and the operation device 42 may be mounted in an occupant's cabin. The UI operation ECU 29 acquires data from the vehicle network 36 and displays the data on the display device 41. The UI operation ECU 29 outputs operations input on the operation device 42 to the vehicle network 36. The UI operation ECU 29 may execute processes based on the input operations, and incorporate results of the processes as data. For example, the UI operation ECU 29 may cause the display device 41 to display a navigation screen for setting destinations, search for a route to a destination selected by inputting an operation, and incorporate the route as route data. The route data may include attribute information such as lanes of roads from a departing location to the destination.

Operation members such as a steering wheel, a brake pedal, an accelerator pedal, and a select lever of transmission (these are not illustrated) are coupled to the driving operation ECU 25 for the occupant to control traveling of the automobile 10. When any operation member is operated, the driving operation ECU 25 outputs, to the vehicle network 36, data including the presence or absence of an operation and an operation amount. The driving operation ECU 25 may execute processes related to the operations on the operation members, and incorporate results of the processes as data. For example, when the accelerator pedal is operated in a situation in which either one of a moving object and a stationary object is present in a traveling direction of the automobile 10, the driving operation ECU 25 may make determination about an abnormal operation and incorporate a result of the determination as data.

Detection members for detection of traveling conditions of the automobile 10 are coupled to the detection ECU 26. Examples of the detection members include a speed sensor 51 that detects a speed of the automobile 10, a three-axis acceleration sensor 52 that detects an acceleration of the automobile 10, a stereo camera 53 that images surroundings of the automobile 10, a cabin camera 54 that images the occupant in the cabin, a microphone 55 that generates data on external and internal sounds, and a GNSS receiver 56 that detects a location of the automobile 10. The GNSS receiver 56 receives radio waves from the GNSS satellites 110 to acquire a current time and a latitude and a longitude serving as a current location of the automobile 10. The detection ECU 26 acquires detection information from each detection member, and outputs data including the detection information to the vehicle network 36. The detection ECU 26 may execute processes based on the detection information, and incorporate results of the processes as data. For example, when the three-axis acceleration sensor 52 detects an acceleration higher than a collision detection threshold, the detection ECU 26 may make determination about collision detection and incorporate a result of the collision detection as data. The detection ECU 26 may extract, from an image obtained by the stereo camera 53, objects around the automobile 10 such as a pedestrian, a different automobile 10, a roadside tree, a utility pole, and a guardrail, make determination about types and attributes of the objects, estimate relative directions and relative distances of the objects or moving directions when the objects are moving based on positions, sizes, and changes of the objects in the image, and output data including prediction information related to collision with the other objects and including results of the estimation to the vehicle network 36.

An external communication device 61 is coupled to the external communication ECU 27. The external communication device 61 establishes wireless communication with a base station 6 of the wireless communication network 5 near the automobile 10. The external communication ECU 27 exchanges data with the server 2 via the wireless communication network 5 through the wireless communication between the external communication device 61 and the base station 6. Those devices constitute the external communication terminal 60 of the automobile 10. The external communication terminal 60 may be a mobile terminal.

An internal communication device 71 is coupled to the internal communication ECU 28. The internal communication device 71 establishes close-proximity wireless communication with a mobile terminal of the occupant in the automobile 10. The internal communication ECU 28 exchanges data with the mobile terminal through the close-proximity wireless communication between the internal communication device 71 and the mobile terminal. The mobile terminal may basically be a terminal that can establish wireless communication with a nearby base station 6 of the wireless communication network 5.

The traveling control ECU 24 controls traveling of the automobile 10. For example, the traveling control ECU 24 acquires data from the external communication ECU 27, the detection ECU 26, and the driving operation ECU 25 via the vehicle network 36, and executes autonomous or manual driving assistance control for the automobile 10. The traveling control ECU 24 generates traveling control data for the automobile 10 based on the acquired data, and outputs the traveling control data to the drive ECU 21, the steering ECU 22, and the braking ECU 23. The drive ECU 21, the steering ECU 22, and the braking ECU 23 control the traveling of the automobile 10 based on the input traveling control data.

A plurality of seatbelt devices, a plurality of air bag devices, and an occupant protection memory 87 are coupled to the occupant protection ECU 30. Examples of the seatbelt devices include a driver's seatbelt device 81 for a driver of the automobile 10, and a passenger's seatbelt device 82 for a passenger of the automobile 10. Examples of the air bag devices include a driver's front air bag device 83 that inflates in front of the driver, a driver's curtain air bag device 84 that inflates on an outer side of the driver, a passenger's front air bag device 85 that inflates in front of the passenger, and a passenger's curtain air bag device 86 that inflates on an outer side of the passenger. Those devices constitute an occupant protection device 80.

The occupant protection ECU 30 actuates or controls the seatbelt devices and the air bag devices based on either one of prediction information on collision with other objects and information on a result of collision detection from the detection ECU 26.

The occupant protection memory 87 is a computer-readable recording medium and records, for example, setting values and programs to be executed by the occupant protection ECU 30. The occupant protection memory 87 may record information on details of control of the occupant protection ECU 30. The occupant protection ECU 30 reads and executes the programs in the occupant protection memory 87. Thus, the occupant protection ECU 30 may function as an occupant protection controller of the automobile 10.

In the automatic emergency reporting system 1 for the automobiles 10, an automobile 10 in an emergency such as an accident can report the accident as the emergency. The automobile 10 in the accident uses its automatic reporting device 4 to transmit, to the server 2 of the call center, emergency information in the accident, such as an operation status of the occupant protection device in the accident, a site of the accident, and an input direction and an intensity of a shock caused by the accident. In the call center, the server 2 checks the received emergency information and makes a call for action to either one of an air medical service and an emergency medical force. Thus, either one of the rescue helicopter and the ambulance 11 can go into action in a shorter lead time to increase a possibility of saving a person in the accident. Further, an emergency action can be taken based on the information in the accident to increase the possibility of saving a person in the accident.

Even though the automobile 10 in the accident transmits the emergency information such as the operation status of the occupant protection device in the accident, the site of the accident, and the input direction and the intensity of the shock caused by the accident, the server 2 may fail to make a call for emergency action satisfactorily responding to the accident. For example, the server 2 can estimate the likelihood of the condition of the occupant after the accident based on the input direction and the intensity of the shock caused by the accident and the operation status of the occupant protection device. However, this estimation is not always accurate estimation of the condition of the occupant after each accident. For example, when the accident has occurred with the occupant seated in an improper posture, there is a possibility that an actual effect of the accident on the occupant cannot correctly be determined under the estimation that the accident has occurred with the occupant seated in a proper posture.

To address such a case, images showing the inside and outside of the automobile 10 at or after the accident may be transmitted from the automobile 10 to the server 2. With those images, the effect of the accident can be determined by determining further details of the situation based on emergency reporting in the accident in combination with information indicating, for example, how the occupant is injured or where and how the cabin is deformed. When an image is captured before the accident, the server 2 can determine the posture of the seated occupant immediately before the accident and determine the effect of the accident more probably based on the emergency information in the accident. The images taken at or after the accident may also be used in combination with the emergency information.

It is appropriate that the traveling automobile 10 can always transmit a large amount of information. For example, it is appropriate that the traveling automobile 10 be kept communicable with 5G base stations 6 instead of 4G base stations 6.

There is a limit to proliferation of public utilities such as the base stations 6 communicable with the automobiles 10. For example, it is not realistic that the 5G base stations 6 capable of communicating a large amount of information be installed along roads with little traffic in suburban areas. In those regions, it is economical to install the general 4G base stations 6 capable of managing a wide zone.

Even in this communication environment, the emergency reporting from the automobile 10 is desirably such that appropriate information can be transmitted to the server 2 and the effect of the accident can be determined more appropriately by using as much information as possible.

Even though an emergency of the automobile is detected in a communication environment in which the status of communication with the server is not determined to be satisfactory, information transmitted before the detection when the communication status is determined to be satisfactory may be used in addition to a small amount of emergency information transmissible when the communication status is not satisfactory. Thus, it is possible to determine the effect of the accident in more detail while avoiding transmission of a large amount of information in the accident and securing priority of transmission of the emergency information.

Next, description is made about measures to address the above problems according to this embodiment.

Figure 5:
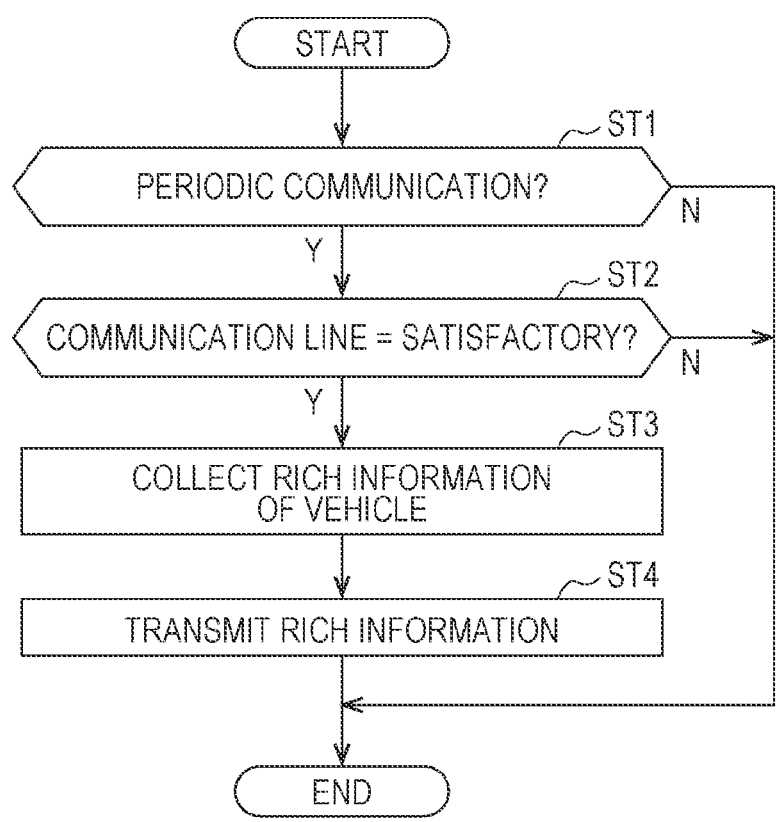
FIG. 5 is a flowchart illustrating a flow of a normality transmission process to be executed periodically by the control system of the automobile in FIG. 4.

FIG. 5 is a flowchart illustrating a flow of a normality transmission process to be executed periodically by the control system 20 of the automobile 10 in FIG. 4.

For example, the external communication ECU 27 of the control system 20 of the automobile 10 periodically repeats the process of FIG. 5 while the automobile 10 is traveling. A control ECU other than the external communication ECU 27, such as the occupant protection ECU 30, may periodically repeat the process of FIG. 5 while the automobile 10 is traveling.

In Step ST1, the external communication ECU 27 determines whether a timing of periodic communication has come. For example, the periodic communication may be executed at intervals of 1 second to several minutes. The interval of the periodic communication may be fixed or variable depending on situations. When the timing of the periodic communication has come, the external communication ECU 27 advances the process to Step ST2. When the timing of the periodic communication has not come, the external communication ECU 27 terminates this process.

In Step ST2, the external communication ECU 27 makes determination about the quality of a communication line between the external communication device 61 and a base station 6. Even in a case of a 5G base station 6, the communication line between the external communication device 61 and the base station 6 may be established in the subordinate 4G system. Even in a 5G or 4G communication line, an assigned band may be changed by, for example, best-effort control. The external communication ECU 27 determines whether the quality of the communication line between the external communication device 61 and the base station 6 is satisfactory because of a band in which both emergency information and rich information described later are transmissible. The external communication ECU 27 of the automobile 10 determines the quality of a communication line between the external communication terminal 60 and the server 2. In one embodiment, the external communication ECU 27 may serve as a "determiner". When the quality of the communication line is satisfactory, the external communication ECU 27 advances the process to Step ST3. When the quality of the communication line is not satisfactory, the external communication ECU 27 terminates this process.

In Step ST3, the external communication ECU 27 communicates with the plurality of control ECUs of the automobile 10 to collect various types of information to be transmitted as the rich information. The external communication ECU 27 periodically collects, in the automobile 10 in a normal state and in an emergency, the rich information to be transmitted to the server 2. In one embodiment, the external communication ECU 27 may serve as a "collector". The external communication ECU 27 records the collected information in an external communication memory (not illustrated) coupled to the external communication ECU 27. The external communication ECU 27 may overwrite previously collected information in the external communication memory with the newly collected information.

Unlike the emergency information based on detection of an emergency, the rich information is collected and transmitted to the server 2 irrespective of the emergency. The rich information is at least information on the automobile 10 before the emergency, and may include information on the automobile 10 at or after the emergency. The external communication ECU 27 may transmit pieces of rich information collected at different timings to the server 2 in the normal state, at the emergency, and after the emergency through the periodic process of FIG. 5. Examples of the rich information include information on a riding status of the occupant in the automobile 10, information on conditions of the automobile 10, information on either one of the latest traveling point and time, and information on any one of a model, a color, and a feature of the automobile 10. The information on the riding status of the occupant may include the number of occupants and their seated positions, seatbelt statuses, sexes, and names. The rich information may include a cabin image captured by the cabin camera. The cabin image may show the size of the occupant.

For example, in the AACN system, the emergency information is standardized accident information to be transmitted through the AACN. In this case, the rich information may be additional information for use in determination about details of an accident except for the standardized accident information.

In Step ST4, the external communication ECU 27 controls the external communication device 61 to transmit the collected information to the server 2 via the base station 6. The external communication ECU 27 may generate transmission data by encoding the information read from the external communication memory as appropriate. The external communication ECU 27 transmits the rich information available in the server 2 from the external communication terminal 60 of the automobile 10 in the normal state of the automobile 10 in which the communication line with the server 2 via the base station 6 is determined to be satisfactory. In one embodiment, the external communication ECU 27 may serve as a "normality transmitter". In the automobile 10 in the normal state, the external communication ECU 27 can transmit all the collected rich information to the server 2. Then, the external communication ECU 27 terminates this process.

Figure 6:
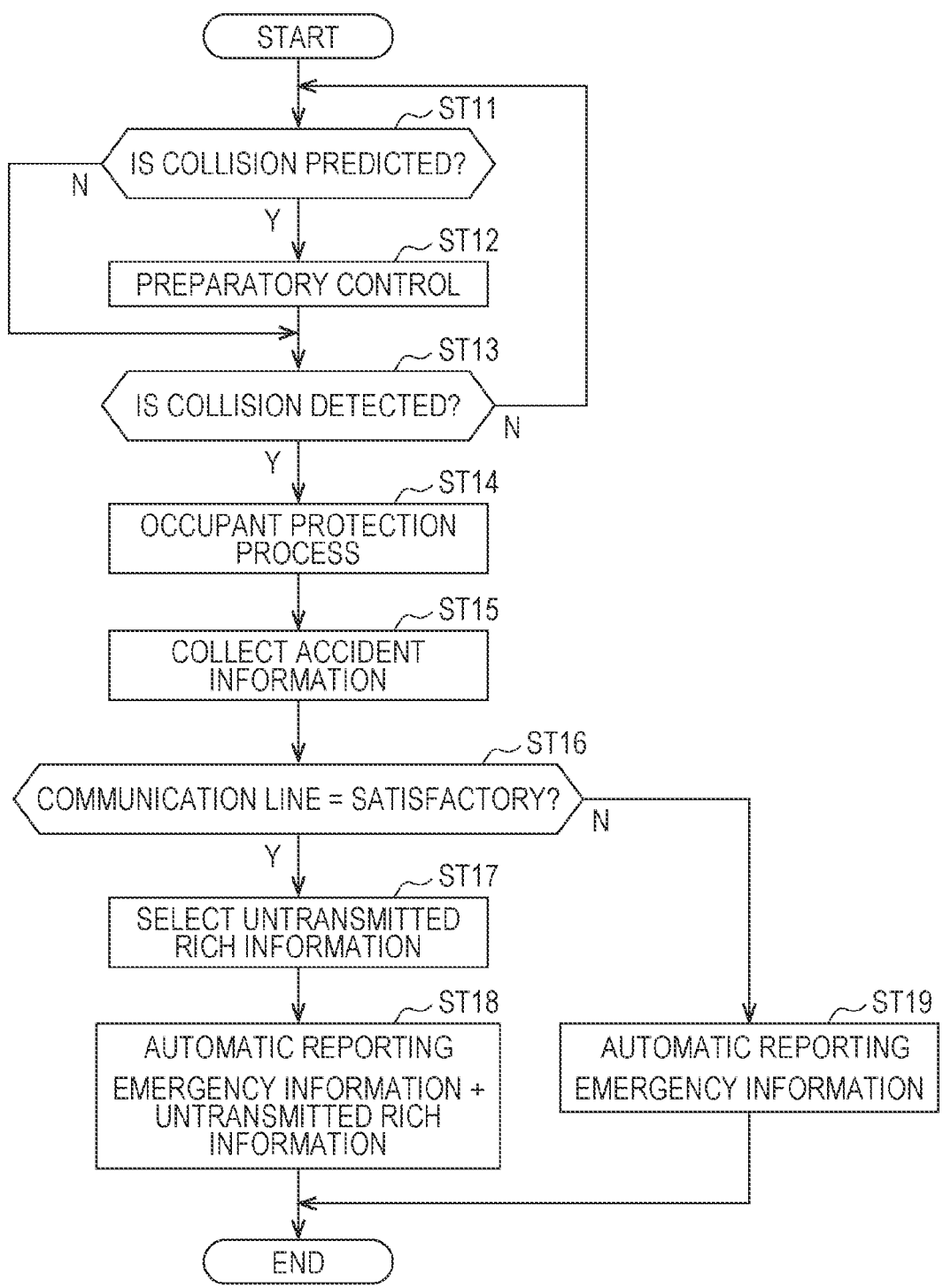
FIG. 6 is a flowchart illustrating a flow of an occupant protection process and an automatic emergency reporting process to be executed by the control system of the automobile in FIG. 4 in the accident.

FIG. 6 is a flowchart illustrating a flow of an occupant protection process and an automatic emergency reporting process to be executed by the control system 20 of the automobile 10 in FIG. 4 in the accident.

The occupant protection ECU 30 of the control system 20 of the automobile 10 periodically repeats the processes of FIG. 6 while the automobile 10 is traveling. In an emergency of the automobile 10, the occupant protection ECU 30 controls automatic transmission of the emergency information to the server 2 using a transmitter. A control ECU other than the occupant protection ECU 30, such as the external communication ECU 27, may periodically repeat the processes of FIG. 6 while the automobile 10 is traveling.

In Step ST11, the detection ECU 26 predicts collision. For example, the detection ECU 26 may predict collision by determining whether any moving object is approaching the automobile 10 based on an image obtained by the stereo camera 53. When no collision is predicted, the detection ECU 26 advances the processes to Step ST13. When the detection ECU 26 predicts that the collision is inevitable, the detection ECU 26 transmits prediction information to the occupant protection ECU 30, and advances the processes to Step ST12.

In Step ST12, the occupant protection ECU 30 executes preparatory control to protect the occupant based on the prediction information transmitted in Step ST11. The occupant protection ECU 30 selects a seatbelt device and an air bag device to be actuated. The occupant protection ECU 30 may select a seatbelt device of the occupant's seat and an air bag device that will inflate on a side where the upper body of the occupant may fall down due to the collision. The occupant protection ECU 30 takes up a surplus part of the seatbelt of the selected seatbelt device to achieve a pretensioned state. Based on an input direction and an intensity of the predicted collision, the occupant protection ECU 30 selects an air bag device that will inflate on the side where the upper body of the occupant may fall down due to the collision.

The occupant protection ECU 30 may execute other processes. For example, the occupant protection ECU 30 may pre-inflate the air bag device.

In Step ST13, the detection ECU 26 detects the collision. For example, the detection ECU 26 detects the collision when the magnitude of an acceleration detected by the three-axis acceleration sensor 52 is higher than the predetermined threshold. The detection ECU 26 detects the emergency such as the collision of the automobile 10. In one embodiment, the detection ECU 26 may serve as a "detector". When the collision is detected, the detection ECU 26 transmits collision detection information to the occupant protection ECU 30, and advances the processes to Step ST14. When no collision is detected, the detection ECU 26 returns the processes to Step ST11. The detection ECU 26 may return the processes to Step ST11 when no collision is detected though a predetermined period has elapsed from the start of the processes.

In Step ST14, the occupant protection ECU 30 executes the occupant protection process. The occupant protection ECU 30 actuates a selected seatbelt device and a selected air bag device. Thus, the seated occupant can be held on the seat and a shock can be absorbed by the air bag even if the occupant is thrown off the seat.

In this embodiment, the occupant protection process is executed after the collision is detected in Step ST13, but may be executed at the stage of preparatory control in Step ST12 subsequent to the prediction of the collision in Step ST11.

In Step ST15, the occupant protection ECU 30 collects accident information as a small amount of emergency information at the time of detection of the collision as the emergency. For example, the occupant protection ECU 30 collects at least information on the magnitude and the direction of an acceleration detected by the three-axis acceleration sensor 52 at the collision in the accident, information on a site and a time of the accident that are acquired by the GNSS receiver 56, and information on the seatbelt device and the air bag device actuated by the occupant protection ECU 30. As the accident information related to an injury of the occupant at the collision, the occupant protection ECU 30 may collect information on either one of an intensity and a direction of the shock on the automobile 10, information on the operation of the occupant protection device in the automobile 10, information on whether multiple collisions have occurred, information on either one of the site and the time of the detection of the collision, information on any one of a model, a color, and a feature of the automobile 10, and images showing the inside and outside of the automobile 10 at the collision in the accident. The occupant protection ECU 30 may collect at least one of those pieces of information as the accident information. The occupant protection ECU 30 collects, in the automobile 10 in the emergency, the emergency information to be transmitted to the server 2. In one embodiment, the occupant protection ECU 30 may serve as a "collector". The occupant protection ECU 30 outputs the collected emergency information to the external communication ECU 27.

The emergency information may be collected by the external communication ECU 27.

In Step ST16, the external communication ECU 27 makes determination about the quality of a communication line between the external communication device 61 and a base station 6. The external communication ECU 27 determines whether the quality of the communication line between the external communication device 61 and the base station 6 is satisfactory because of a band in which both the emergency information and the rich information are transmissible. For the determination, the external communication ECU 27 may acquire a current quality of the communication line between the external communication device 61 and the base station 6. The external communication ECU 27 of the automobile 10 determines the quality of the communication line between the external communication terminal 60 and the server 2. In one embodiment, the external communication ECU 27 may serve as a "determiner". When the quality of the communication line is satisfactory, the external communication ECU 27 advances the processes to Step ST17. When the quality of the communication line is not satisfactory, the external communication ECU 27 advances the processes to Step ST19.

In Step ST17, the external communication ECU 27 selects untransmitted information in collected rich information. The external communication ECU 27 selects information collected by the external communication ECU 27 but has not been transmitted yet. The external communication ECU 27 may avoid selecting, from among a plurality of pieces of information constituting the rich information, information overlapping the collected emergency information though the information has not been transmitted yet. Thus, transmission of the overlapping information can be suppressed.

In Step ST18, the external communication ECU 27 executes automatic reporting in the state in which the status of the communication line with the server 2 is determined to be satisfactory. The external communication ECU 27 transmits the emergency information and the untransmitted rich information by using the external communication device 61 capable of establishing satisfactory communication with the server 2. Thus, the external communication ECU 27 transmits, to the server 2, the untransmitted rich information together with the collected emergency information related to the emergency such as the collision of the automobile 10 based on the detection of the emergency such as the accident of the automobile 10 in the state in which the communication line with the server 2 is satisfactory. The external communication device 61 transmits the emergency information and the untransmitted rich information via the base station 6 to the server 2 that makes a call for emergency action.

In Step ST19, the external communication ECU 27 executes automatic reporting in the state in which the status of the communication line with the server 2 is determined to be unsatisfactory. The external communication ECU 27 transmits the emergency information by using the external communication device 61 capable of establishing unsatisfactory communication with the server 2. Thus, the external communication ECU 27 transmits, to the server 2, the collected emergency information related to the emergency such as the collision of the automobile 10 based on the detection of the emergency such as the accident of the automobile 10 in the state in which the communication line with the server 2 is unsatisfactory. The external communication device 61 transmits the emergency information via the base station 6 to the server 2 that makes a call for emergency action.

The occupant protection ECU 30 transmits at least the collected emergency information through the communication depending on whether the status of the communication line with the server 2 is satisfactory in the automobile 10 in the emergency. In one embodiment, the occupant protection ECU 30 may serve as an "emergency transmitter".

Figure 7:
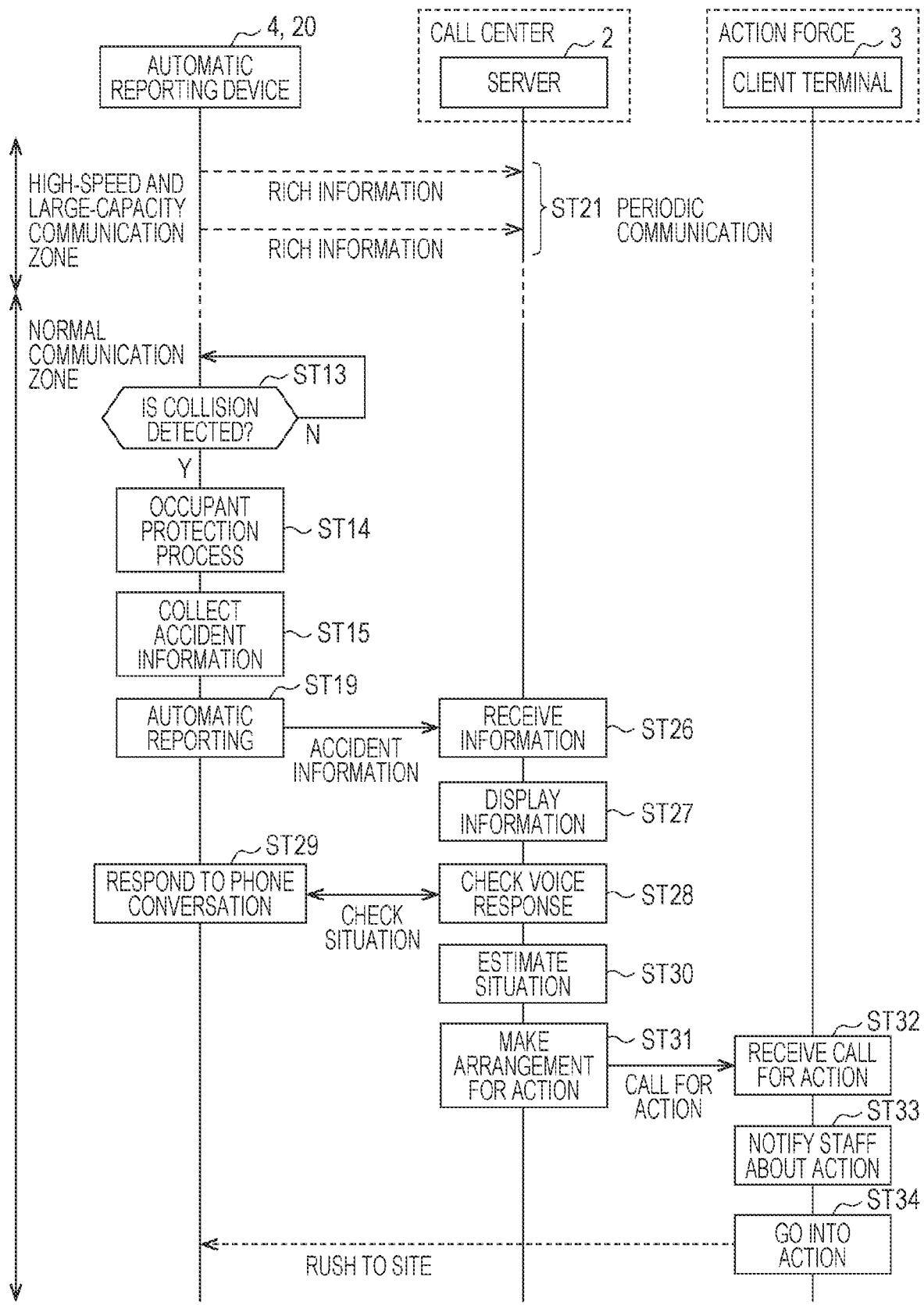
FIG. 7 is a sequence chart illustrating an example of a flow of a series of processes in the automatic emergency reporting system of FIG. 1 based on the processes of FIG. 5 and FIG. 6.

FIG. 7 is a sequence chart illustrating an example of a flow of a series of processes in the automatic emergency reporting system 1 of FIG. 1 based on the processes of FIG. 5 and FIG. 6.

FIG. 7 illustrates an example in which an automobile 10 traveling in a high-speed and large-capacity communication zone moves to a normal communication zone and has an accident.

FIG. 7 illustrates the control system 20 serving as the automatic reporting device 4 of the automobile 10, the server 2 of the call center, and the client terminal 3 of the action force. Time advances from top to bottom.

In Step ST21, the automatic reporting device 4 of the automobile 10 traveling in the high-speed and large-capacity communication zone periodically transmits rich information to the server 2. Thus, the server 2 can continuously acquire the latest rich information on the automobile 10. Then, the automobile 10 moves from the high-speed and large-capacity communication zone to the normal communication zone. The automatic reporting device 4 stops periodically transmitting the rich information to the server 2.

In Step ST13, the detection ECU 26 of the automatic reporting device 4 of the automobile 10 that has moved to the normal communication zone detects collision of the automobile 10.

In Step ST14, the occupant protection ECU 30 of the automobile 10 executes the occupant protection process.

In Step ST15, either one of the occupant protection ECU 30 and the external communication ECU 27 of the automobile 10 collects accident information. The accident information may basically be collected in the AACN. In the AACN, accident information such as an operation status of the occupant protection device 80 in the accident, a site of the accident, and an input direction and an intensity of a shock caused by the accident is collected.

In Step ST19, the external communication ECU 27 of the automobile 10 automatically reports the collected accident information based on the detection of the accident.

In Step ST26, the server communication device 91 of the server 2 of the call center receives the information automatically reported from the automobile 10 in the accident. The received information may be recorded in the server memory 92.

When the server communication device 91 receives the emergency information reported from the automobile 10 in the accident in Step ST19, the server communication device 91 acquires, based on a vehicle ID in the information, the latest rich information of the same vehicle ID in the rich information that has already been received.

In Step ST27, the server CPU 93 of the server 2 of the call center displays the received information on the server monitor 95. The operator of the call center can check details of the accident of the automobile 10 based on the displayed accident information.

In Step ST28, the server CPU 93 of the server 2 of the call center communicates with the external communication ECU 27 of the automobile 10 in the accident. In Step ST29, the occupant protection ECU 30 of the automobile 10 responds to a voice call. Thus, a phone conversation line is established to make a phone conversation between the server phone conversation device 96 and, for example, the microphone 55 of the automobile 10. The operator of the call center checks the occupant's safety and health level by voice. Thus, the operator can directly check conditions such as how the occupant of the automobile 10 in the accident is injured. The operator may input check results to the server 2.

In Step ST30, the server CPU 93 of the server 2 of the call center estimates the situation of the accident. The server CPU 93 may estimate the situation based on the automatically reported information received by the server communication device 91 and the information input by the operator of the call center. The server CPU 93 may estimate the situation through a process of artificial intelligence making comparison with previous accident information. The operator may estimate the situation by considering the situation comprehensively, and input an estimation result to the server 2.

The server communication device 91 additionally receives the rich information on the conditions of the automobile 10 together with or prior to the emergency information in the accident. For example, the server CPU 93 determines details of a posture of the occupant in the automobile 10 before the accident based on a captured image in the rich information before the accident, and determines the situation of the accident based on an actual posture by using the determined posture and the emergency information.

From the automobile 10 traveling not in the normal communication zone but in the high-speed and large-capacity communication zone before the accident, the server communication device 91 can receive at least the rich information on the conditions of the automobile 10 before the accident together with the emergency information in the accident. In this case, the server CPU 93 can determine a posture of the occupant in the automobile 10 immediately before the accident based on a captured image in the rich information immediately before the accident. The server CPU 93 can determine the conditions immediately before the accident more probably.

In Step ST31, the server CPU 93 of the server 2 of the call center makes arrangement for action. The server CPU 93 uses the server communication device 91 to transmit a call for action to the client terminal 3 of the action force. The server CPU 93 may transmit the call for action based on an operation by the operator of the call center.

In Step ST32, the client communication device 101 of the client terminal 3 of the action force receives the call for action from the server 2. The received call for action may be recorded in the client memory 102.

In Step ST33, the client CPU 103 of the client terminal 3 of the action force notifies the staff about action. The client CPU 103 causes the client notification device 104 to output a sound indicating the call for action based on the reception of the call for action by the client communication device 101. The client CPU 103 may display a screen of the call for action on the client monitor 106. The screen may show the automatically reported information and the information input by the operator of the call center.

In Step ST34, the staff members of the action force go into action. The staff members can grasp, based on the sound and the screen of the call for action, that the call for action is made to their action force, and take an emergency action by using either one of the rescue helicopter and the ambulance 11. Either one of the rescue helicopter and the ambulance 11 can rush to the site of the accident with rescue equipment for the situation of the accident.

When the automobile 10 has an accident while traveling in the high-speed and large-capacity communication zone unlike the situation of FIG. 7, automatic reporting is executed in Step ST18 instead of Step ST19 to transmit emergency information and either one of untransmitted rich information and rich information at or after the accident to the server 2. The server 2 acquires the accident information collected in the accident and the latest rich information, and executes the subsequent processes. The operator of the call center can make determination based on the latest rich information even about a matter on which the operator has difficulty in making determination based on the collected accident information.

In the embodiment described above, the automobile 10 transmits, to the server 2, the rich information available in the server 2 in addition to the small amount of emergency information related to the emergency such as the collision of the automobile 10. Unlike the emergency information based on the detection of the emergency, the rich information is transmitted to the server 2 irrespective of the emergency. For example, the rich information is the information before the emergency, including the information on the riding status of the occupant in the automobile 10, the information on the conditions of the automobile 10, the information on either one of the latest traveling point and time, the information on any one of the model, the color, and the feature of the automobile 10, and the latest images showing the inside and outside of the automobile 10. Thus, the server 2 can acquire, by using the rich information on, for example, the riding status in the automobile 10, at least the information related to the condition of the occupant before the emergency such as the collision, and determine the situation of the emergency on which accurate determination is difficult based on the small amount of emergency information.

In this embodiment, the automobile 10 causes its determiner to determine the quality of the communication line between the communication terminal and the server 2, and switches information to be transmitted in the emergency based on the quality. For example, when the emergency such as the collision of the automobile 10 is detected in the state in which the status of the communication line with the server 2 is determined to be satisfactory, the rich information is transmitted together with the emergency information related to the emergency. When the emergency is detected in the state in which the status of the communication line with the server 2 is not determined to be satisfactory, the emergency information is transmitted. For example, as the information related to the injury of the occupant at the collision, the small amount of emergency information at the time of detection of the collision may include at least one of the information on either one of the intensity and the direction of the shock on the automobile 10, the information on the operation of the occupant protection device in the automobile 10, the information on whether multiple collisions have occurred, the information on either one of the site and the time of the detection of the collision, the information on any one of the model, the color, and the feature of the automobile 10, or the images showing the inside and outside of the automobile 10 at the collision in the accident. Thus, when the emergency is detected, the transmission of the emergency information is enabled and the transmission of the rich information is disabled in the state in which the status of the communication line with the server 2 is not determined to be satisfactory. It is possible to effectively reduce the occurrence of a case where completion of the transmission of the emergency information is delayed or the emergency information is not properly transmitted to the server 2 due to the transmission of a large amount of information including the emergency information and the rich information in the state in which the status of the communication line with the server 2 is not determined to be satisfactory. When the emergency is detected in the automobile 10, the server 2 can promptly receive the emergency information indicating the occurrence of the emergency irrespective of the quality of the communication line with the automobile 10.

In this embodiment, even if the server 2 does not receive the rich information in the emergency, the server 2 has already received the latest rich information in advance in the normal state before the emergency. Therefore, the server 2 can use the rich information acquired before the emergency in combination with the emergency information acquired in the emergency to determine the situation of the emergency on which accurate determination is difficult based on the small amount of emergency information. The server 2 can determine the situation of the emergency irrespective of the status of the communication line between the communication terminal and the server 2.

By changing the amount of information to be transmitted from the communication terminal of the automobile 10 to the server 2 in the emergency through adaptation to the status of communication between the communication terminal and the server 2, the external communication terminal 60 of the automobile 10 can transmit the rich information useful in the server 2 in the emergency without being restricted by the proliferation of the public utilities such as the base stations 6 communicable with the automobiles 10.

In this embodiment, the automobile 10 in the normal state and in the emergency periodically collects the rich information to be transmitted to the server 2. In the normal state, all the collected rich information is transmitted to the server 2. In the emergency, untransmitted rich information together with the emergency information collected in the automobile 10 in the emergency is transmitted depending on the status of the communication line with the server 2. Thus, the automobile 10 in the emergency can transmit the rich information that has not been transmitted in the normal state. Further, the automobile 10 in the emergency can transmit the small amount of emergency information depending on the status of the communication line with the server 2.

The embodiment described above is an exemplary embodiment of the disclosure, but the embodiment of the disclosure is not limited to this embodiment, and various modifications and changes may be made without departing from the gist of the disclosure.

In the embodiment described above, the plurality of ECUs are provided separately in the automobile 10, but a subset or all of the ECUs may be integrated into a single ECU.

In the embodiment of the disclosure, when the status of communication with the server is satisfactory, the vehicle in the normal state and in the emergency transmits, from the communication terminal to the server, the rich information available in the server in addition to the emergency information related to the emergency of the vehicle. Unlike the emergency information for use in the estimation of the condition after the accident based on the detection of the emergency, the rich information is a large amount of information that is richer than the emergency information and useful for achieving more accurate estimation of the condition after the accident but may hinder communication when the status of communication with the server is not satisfactory. The rich information may include at least one of the information on the riding status of the occupant in the vehicle, the information on the conditions of the vehicle, the information on either one of the latest traveling point and time, the information on any one of the model, the color, and the feature of the vehicle, or the latest captured image. Thus, the server can use the rich information on, for example, the riding status in the vehicle to determine the situation of the emergency on which accurate determination is difficult based on the emergency information.

In the embodiment of the disclosure, the vehicle causes its determiner to determine the quality of the communication between the communication terminal and the server, and switches information to be transmitted in the emergency based on the quality. For example, when the emergency of the vehicle is detected in the state in which the status of communication with the server is determined to be satisfactory, the rich information is transmitted together with the emergency information related to the emergency. When the emergency of the vehicle is detected in the state in which the status of communication with the server is not determined to be satisfactory, the emergency information is transmitted. For example, as the information related to the injury of the occupant at the collision, the emergency information at the time of detection of the collision may include at least one of the information on either one of the intensity and the direction of the shock on the vehicle, the information on the operation of the occupant protection device in the vehicle, the information on whether multiple collisions have occurred, the information on either one of the site and the time of the detection of the collision, the information on any one of the model, the color, and the feature of the vehicle, or the image captured in the accident. Thus, when the emergency of the vehicle is detected, the transmission of the emergency information is enabled and the transmission of the rich information is disabled in the state in which the status of communication with the server is not determined to be satisfactory. It is possible to effectively reduce the occurrence of the case where the completion of the transmission of the emergency information is delayed or the emergency information is not properly transmitted to the server due to the transmission of a large amount of information including the emergency information and the rich information in the state in which the status of communication with the server is not determined to be satisfactory. When the emergency has occurred in the vehicle, the server can promptly receive at least the emergency information indicating the occurrence of the emergency even in the state in which the status of the communication line with the vehicle is not determined to be satisfactory.

In the embodiment of the disclosure, even if the server does not acquire the rich information in the emergency, the server has already received the latest rich information in advance in the normal state. Therefore, the server can use the emergency information in combination with the rich information acquired before the emergency to determine the situation of the emergency on which accurate determination is difficult based on the emergency information related to the emergency of the vehicle. In this case, detailed information is not acquired about, for example, the condition of the occupant after the accident because the rich information is not acquired in the emergency. However, a part of the rich information acquired in advance can be used to acquire detailed information about, for example, the condition of the occupant in the normal state before the accident. By using the part of the rich information in the state in which the status of communication with the server is not determined to be satisfactory, the situation of the emergency can be estimated more accurately than in the case where the emergency information is acquired.

By changing the amount of information to be transmitted from the communication terminal of the vehicle to the server in the emergency through adaptation to the status of communication between the communication terminal and the server, the communication terminal can transmit the rich information useful in the server in the emergency without being restricted by the proliferation of the public utilities such as the base stations communicable with the vehicles.

The control system 20 illustrated in FIG. 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the drive ECU 21, the steering ECU 22, the braking ECU 23, the traveling control ECU 24, the driving operation ECU 25, the detection ECU 26, the external communication ECU 27, the internal communication ECU 28, the UI operation ECU 29, and the occupant protection ECU 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 4.

The invention claimed is:

1. An automatic emergency reporting system for a vehicle, the automatic emergency reporting system comprising one or more electronic control units for the vehicle, the one or more electronic control units being configured to:
execute periodically transmitting first information from a communication terminal to a server while the communication terminal and the server are in a first communication state, and stop periodically transmitting the first information when the communication terminal and the server are not in the first communication state;

transmit, when (1) the vehicle is in emergency and (2) the communication terminal and the server are in the first communication state, the first information together with second information to the server, the second information including data on which the vehicle is in emergency and first identification data of the vehicle; and transmit, when (1) the vehicle is in emergency and (2) the communication terminal and the server are in a second communication state that is different from the first communication state, only the second information from the first information and the second information to the server, wherein the server configured to:
identify a latest piece of first information from pieces of the first information that have already been received by the server based on vehicle identification data; and determine a situation of the accident based on the latest first information.

2. The automatic emergency reporting system for the vehicle according to claim 1, wherein the one or more electronic control units are configured to transmit, as the second information, information that has not been periodically transmitted as the first information.

3. The automatic emergency reporting system for the vehicle according to claim 2, wherein the one or more electronic control units are configured to:
collect the first information and the second information; and transmit, when the communication terminal and the server are in the first communication state, at least untransmitted first information out of the collected first information.

4. The automatic emergency reporting system for the vehicle according to claim 2, wherein the second information is collected at a time of detection of a collision of the vehicle and comprises, as information related to an injury of an occupant in the vehicle at the collision, at least one of (1) information on an intensity or a direction of a shock on the vehicle, (2) information on an operation of an occupant protection device in the vehicle, (3) information on whether multiple collisions have occurred, (4) information on a site where the collision is detected or a time when the collision is detected, (5) information on a model, color, or feature of the vehicle, and (6) an image captured in an accident.

5. The automatic emergency reporting system for the vehicle according to claim 2, wherein the first information comprises at least one of (1) information on a riding status of an occupant in the vehicle, (2) information on conditions of the vehicle, (3) information on a latest traveling point or a time, (4) information on a model, color, or feature of the vehicle, and (5) a latest captured image.

6. The automatic emergency reporting system for the vehicle according to claim 3, wherein the second information is collected at a time of detection of a collision of the vehicle and comprises, as information related to an injury of an occupant in the vehicle at the collision, at least one of (1) information on either one of an intensity or a direction of a shock on the vehicle, (2) information on an operation of an occupant protection device in the vehicle, (3) information on whether multiple collisions have occurred, (4) information on either one of a site where the collision is detected or a time of the detection of when the collision is detected, (5) information on any one of a model, color, or feature of the vehicle, and (6) an image captured in an accident.

7. The automatic emergency reporting system for the vehicle according to claim 1, wherein the one or more electronic control units are configured to:
collect the first information and the second information; and transmit, when the communication terminal and the server are in the first communication state, at least untransmitted first information out of the collected first information.

8. The automatic emergency reporting system for the vehicle according to claim 7, wherein the second information is collected at a time of detection of a collision of the vehicle and comprises, as information related to an injury of an occupant in the vehicle at the collision, at least one of (1) information on either one of an intensity or a direction of a shock on the vehicle, (2) information on an operation of an occupant protection device in the vehicle, (3) information on whether multiple collisions have occurred, (4) information on either one of a site where the collision is detected or a time of the detection of when the collision is detected, (5) information on any one of a model, color, or feature of the vehicle, and (6) an image captured in an accident.

9. The automatic emergency reporting system for the vehicle according to claim 7, wherein the first information available in the server comprises at least one of (1) information on a riding status of an occupant in the vehicle, (2) information on conditions of the vehicle, (3) information on either one of a latest traveling point or a time, (4) information on any one of a model, color, or feature of the vehicle, and (5) a latest captured image including the image showing the occupant or the occupants of the vehicle.

10. The automatic emergency reporting system for the vehicle according to claim 1, wherein the second information is collected at a time of detection of a collision of the vehicle and comprises, as information related to an injury of an occupant in the vehicle at the collision, at least one of (1) information on an intensity or a direction of a shock on the vehicle, (2) information on an operation of an occupant protection device in the vehicle, (3) information on whether multiple collisions have occurred, (4) information on a site where the collision is detected or a time when the collision is detected, (5) information on a model, color, or feature of the vehicle, and (6) an image captured in an accident.

11. The automatic emergency reporting system for the vehicle according to claim 1, wherein the first information comprises at least one of (1) information on a riding status of an occupant in the vehicle, (2) information on conditions of the vehicle, (3) information on a latest traveling point or a time, (4) information on a model, color, or feature of the vehicle, and (5) a latest captured image.

12. The automatic emergency reporting system for the vehicle according to claim 1, wherein the first information includes an image of an object in a cabin of the vehicle, and the second information includes standardized accident information to be transmitted through Advanced Automatic Collision Notification system.

13. The automatic emergency reporting system for the vehicle according to claim 1, wherein the communication terminal and the server communicate with each other at higher speed and/or larger capacity in the first communication state than in the second communication state.

14. An automatic emergency reporting system for a vehicle, the automatic emergency reporting system comprising circuitry configured to:

execute periodically transmitting first information from a communication terminal to a server while the communication terminal and the server are in a first communication state, and stop periodically transmitting the first information when the communication terminal and the server are not in the first communication state;

transmit, when (1) the vehicle is in emergency and (2) the communication terminal and the server are in the first communication state, the first information together with the second information to the server, the second information including data on which the vehicle is in emergency and first identification data of the vehicle; and transmit, when (1) the vehicle is in emergency and (2) the communication terminal and the server are in a second communication state that is different from the first communication state, only the second information from the first information and the second information to the server, wherein the server configured to:
identify a latest piece of first information from pieces of the first information that have already been received by the server based on vehicle identification data; and determine a situation of the accident based on the latest first information.

15. The automatic emergency reporting system for the vehicle according to claim 14, wherein the first information includes an image of an object in a cabin of the vehicle, and the second information includes standardized information on an accident of the vehicle to be transmitted through Advanced Automatic Collision Notification system.

16. The automatic emergency reporting system for the vehicle according to claim 14, wherein the communication terminal and the server communicate with each other at higher speed and/or larger capacity in the first communication state than in the second communication state.

* * * * *